May 9, 1950          L. A. MYERS          2,506,647
APPARATUS FOR PRODUCING SULFURIC ACID
Filed Sept. 22, 1943
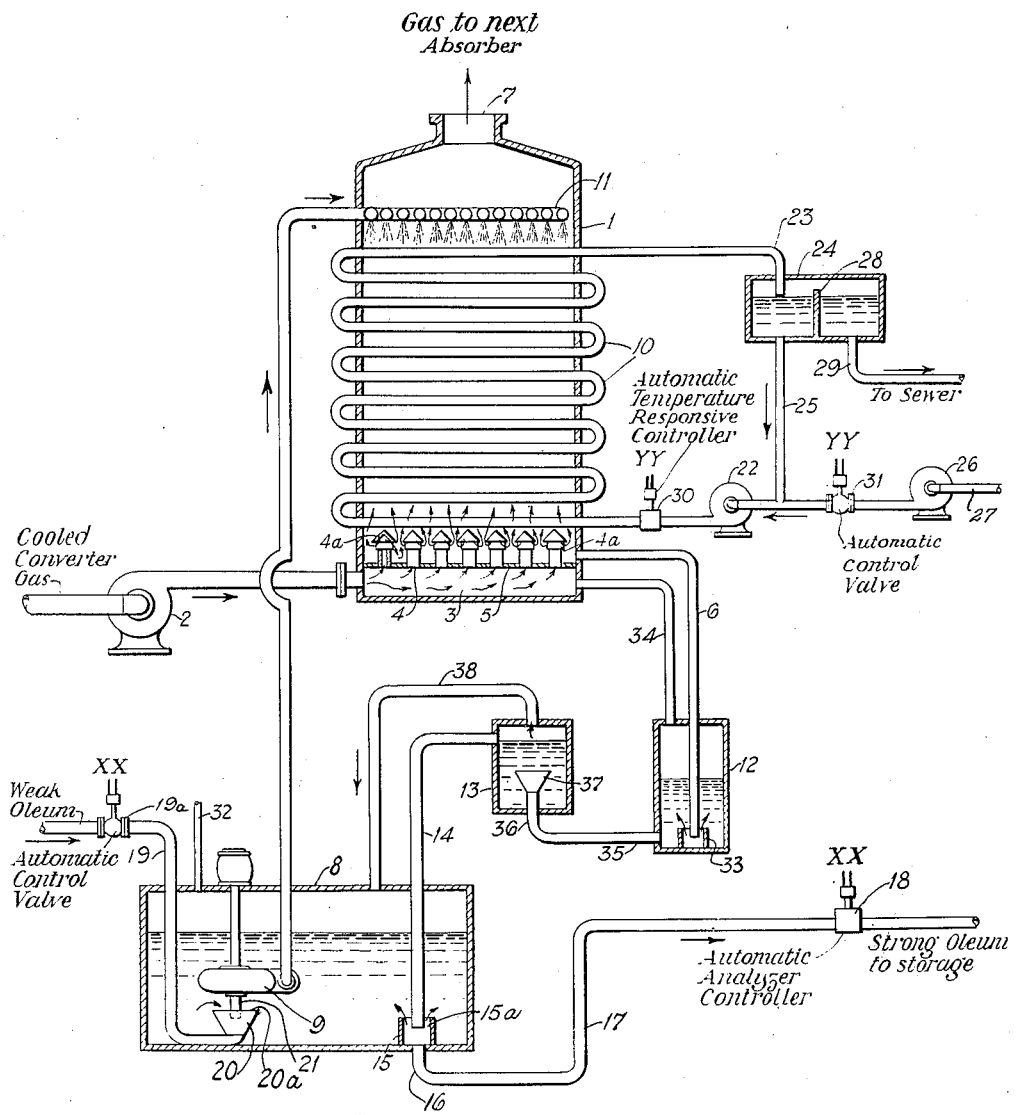
Lee A. Myers     INVENTOR.
BY George Johnson
ATTORNEY Patented May 9, 1950

2,506,647

UNITED STATES PATENT OFFICE 2,506,647

APPARATUS FOR PRODUCING SULFURIC ACID

Lee A. Myers, Wilmington, Del., assignor to E. I. du Pont de Nemours & Company, Wilmington, Del., a corporation of Delaware Application September 22, 1943, Serial No. 503,321

2 Claims. (Cl. 23—261)

This invention relates to the manufacture of oleum and is particularly directed to methods of absorbing sulfur trioxide in weak oleum in internally cooled absorption towers.

Oleum as commonly produced from converter gases is made in several grades, usually as 20, 30 or 40% oleum. Stronger acid, while theoretically possible, is not made commercially directly from converter gases because the vapor pressure of $SO_3$ in such gases is too low to make it economical to make a stronger oleum direct. The several grades are produced by contacting the converter gas with a relatively weak acid in a suitably dispersed condition with suitable cooling to effect removal of the heat of absorption. This is commonly effected in absorption systems in which dispersion of the weak oleum is effected by allowing it to flow down through a packed tower, and cooling is obtained by circulating copious quantities of cold acid through the tower. The effluent acid from the absorption tower is withdrawn into external coolers and then recycled to the absorption tower. The make is bled off and will have a strength of 20, 30, or 40%, according to the conditions maintained in the absorption.

The principal drawback to absorption systems of this character lies in the fact that great quantities of acid must be circulated over the tower in order to maintain a suitable temperature differential between the acid fed to the tower and that withdrawn for cooling. If this differential is too great the tower functions imperfectly as an absorption unit. Large quantities of in-process acid are therefore required. Large cooling units are required to handle such acid and a large amount of power is required in keeping it circulating over the tower.

Internally cooled absorption towers are generally well known in other arts, for example, in the absorption of hydrochloric acid gas, but it does not appear that they have ever been successfully adapted to the absorption of sulfur trioxide, especially in the production of strong oleum. Internally cooled absorption towers are recognized as having advantages in eliminating excessive circulation of cold acid over the tower and in eliminating high differentials between the temperature of the acid fed to the tower and that withdrawn. These advantages are obtained by substituting for the packing which normally fills an absorption tower, a plurality of vertical banks of serially connected horizontal cooling pipes through which cooling water is passed to effect abstraction of the heat of absorption at the point at which it is liberated. Notwithstanding these recognized advantages of internally cooled absorption towers the art has not heretofore successfully adapted them to the manufacture of oleum.

It is my observation that one reason at least why internally cooled absorption towers have not heretofore been adapted to the manufacture of oleum is that their high cooling efficiency has been considered inimical to the high freezing point of strong oleum. When oleum of about 40% free $SO_3$ content is maintained under sufficient sulfur trioxide vapor pressure to prevent degradation by fuming it sets up as a solid mass at ordinary temperatures. These conditions obtain in an internally cooled absorption tower in the ordinary design and operation of such towers so that setting up of oleum and clogging of the towers would necessarily have resulted in any attempts to operate such systems especially in the wintertime when the cooling water is at an abnormally low temperature.

I have now found that the disadvantages of the prior art may be avoided and the advantages of internally cooled absorption towers obtained in the manufacture of strong oleum by means of the methods and apparatus as described hereinafter and illustrated diagrammatically in the accompanying drawing.

In the illustrative embodiment of the drawing weak oleum is fed to the top of an absorption tower 1 and permitted to flow down over the surface of the cooling elements in a dispersed state, that is, as a film on the surfaces of the cooling elements, while other conditions are observed and maintained, as will be more particularly described, in order to obtain optimum absorption in the tower. The weak oleum is circulated over the tower in sufficient volume to cause the weak oleum to film out over the surfaces of the cooling elements and thoroly to wet all such surfaces exposed to the converter gases. Thus the sulfur trioxide-containing gas (converter gas) is brought into contact with oleum in a dispersed state while at the same time the dispersed oleum is in contact with a heat exchange surface and the heat of solution or absorption is abstracted at the precise point at which absorption takes place. Thus it is not necessary to circulate a large volume of acid thru the tower to effect cooling or to regulate the flow of the acid thru the tower according as greater or lesser degree of cooling is required. On the contrary, the flow of acid thru the tower is maintained at a substantially uniform rate and operation of the tower remains essentially the same irrespective of differing thermal loads placed upon it by differing ambient conditions.

Were it not for the desirability of providing sufficient volume of acid adequately to wet the cooling surfaces in the absorption tower it would not be necessary to recirculate acid thru the tower and, as a matter of fact, if the weak oleum were sufficiently strong it would not be necessary to recirculate acid over the tower at all. As a practical matter, however, and in order to adapt the system to the fortifying of oleum which is relatively weak as compared to the strong oleum product, it is desirable to provide methods and apparatus for recirculating acid over the tower and my invention is concerned with such methods and apparatus. These and other advantages of, and other applications of my invention will be more easily understood after consideration of the following detailed description of a typical operation in accordance with the flow sheet of the drawing.

Sulfur trioxide-containing gases discharged from a contact converter and suitably cooled are passed up thru the tower 1 under the influence of the blower 2. The gas passes into the bottom chamber 3 thru a plurality of apertures 4 in the distributing plate 5. Each of the apertures 4 projects sufficiently above the distributor plate 5 so that the acid can flow out the outlet pipe 6 without flowing into the chamber 3, and each aperture is covered by a conical cap 4a which serves two functions, namely, that of preventing acid from flowing into the chamber 3 and that of imparting a reversal of flow to the gases passing into the absorption tower 1, so that effective distribution of the gas entering the tower is obtained. Gases then pass up thru the tower and out the exit 7, whence they may be led to the next absorber or disposed of in any desired or suitable manner.

Oleum of absorption strength is circulated over and thru the tower 1 in a closed circuit including the tower and the reservoir 8. Relatively weak acid from another absorption step is commingled with the effluent from the tower and the resulting product is elevated by the pump 9 to the top of the tower where it is distributed over the cooling elements 10 by the distributor 11. It then films down over the cooling elements 10, passes out thru the outlet 6 into the degassing units 12 and 13, and then thru pipe 14 into the reservoir 8.

In order to provide for proper distribution of the product between storage and the reservoir 8 the conduit which conducts product to storage is arranged to pass thru the reservoir and is provided with an outlet located at a point below the normal liquid level in the reservoir thru which product acid can pass into the reservoir. Subsequent to this outlet the conduit includes an hydrostatic column which determines the level of liquid in the reservoir. According to the form illustrated in the drawing the pipe 14 is continued into the reservoir 8 to a point beneath the normal level of liquid into the somewhat larger pipe 15 so as to provide an annular outlet 15a thru which product acid can enter the acid in the reservoir. The pipe 15 also communicates with the outlet means 16, which preferably is in the bottom or in line with the normal flow of liquid from pipe 14 in case the pipes 14 and 15 are disposed in reservoir 8 in other than the vertical position shown, which in turn communicates with the hydrostatic column 17 arranged to maintain the desired level of liquid in the reservoir 8. The pipes 14, 15, 16 and 17 thus constitute a continuous conduit for conducting product from the tower to storage, and the pipe 15, an annular outlet 15a about the pipe 14 for bleeding off product into reservoir 8. By properly proportioning the cross-sectional area of outlet 15 as compared with the cross-sectional area of pipe 14, say in direct proportion to the respective flow of liquids, there will be a constant stream of product flowing out of outlet 15a so that none of the relatively dilute oleum in reservoir 8 can have access to the outlet means 16.

The automatic analyzer 18 determines the strength of the oleum produced, and if there is variation from the standard the analyzer automatically actuates the automatic control valve 19a to feed more or less weak oleum into the reservoir 8 thru the pipe 19. As the pump 9 delivers a constant head of acid to the distributor 11 any increase in the amount of weak acid fed to the reservoir 8 will cause more of the product acid to flow out outlet 16 thru the hydrostatic column 17 and less of it to flow out thru outlet 15a into the reservoir. In the opposite conditions more of the product acid will flow thru outlet 15a into the reservoir. Thus the strength of the product acid is maintained constant and the make-up of the absorbent acid varied according to the capacity of the absorber to take up $SO_3$. Acid is thus continuously produced having a strength within acceptable variance of a standard.

Weak acid is introduced by a conduit communicating directly with the intake of pump 9. This conduit is provided with an inlet opening also to admit oleum from reservoir 8 to the intake. In the form illustrated the inlet for weak acid is constructed substantially in the same manner as the outlet for the strong oleum in that pipe 19 feeds into the pipe 20 which in this case is made conical in order to facilitate insertion of the intake 21 of the pump 9. The intake 21 of the pump 9 projects into the pipe 20 thus providing an annular inlet 20a thru which liquid is drawn into the pump from reservoir 8 at the same time that the weak oleum entering into pipe 19 passes directly into the intake 21 of pump 9. With proper proportioning of the inlet 20a, as in the case of the outlet 15a, there is a constant flow of acid into the pipe 20 from reservoir 8.

The effect of the arrangement is to confine the actual dilution of the acid to the pump 9 and thereby to minimize corrosion. When weak oleum is brought in contact with the relatively strong oleum of the reservoir 8 heat is liberated due to the heat of dilution and a local region of acid of higher heat content is produced. The acid which is affected by this heat of dilution is more corrosive because of its higher heat content. The structure shown causes this more corrosive acid to go directly into the pump, which is made of a stainless acid-resisting alloy, rather than into the reservoir 8. Thus the reservoir 8 can be constructed of an inferior and cheaper alloy which is satisfactorily resistant to the relatively cold acid therein.

The pump is a constant speed pump maintaining a uniform rate of flow of acid to the tower 1. Hence, for each unit of weight of acid introduced through the inlet pipe 19 there must be one unit plus the unit weight of the $SO_3$ absorbed in tower 1 of product discharged through the outlet 16 to storage. If the strength of the product becomes too high automatic analyzer controller 18 actuates automatic control valve 19 to increase the flow of weak oleum and, if the strength of the product is too low, to decrease the flow of weak oleum. The net result is that the strength of the acid fed to the tower 1 is varied according to the absorptive capacity of the tower which is variable according to the temperature and volume of gas fed to the absorber tower 1, and according to the effectiveness of the internal cooling as might be variable under variable conditions of ambient temperatures. The invention provides effective methods and apparatus for compensating for the latter variable.

To minimize the effect of variations in ambient (meteorological) temperatures upon the efficiency of the absorber there is provided for continuous circulation of cooling medium through the cooling elements 10. This circulation is maintained by means of pump 22 which causes the cooling medium to flow, preferably upwardly, through the cooling elements 10, out through pipe 23 into a receiver 24. The cooling medium is withdrawn from the receiver 24 through pipe 25 to the intake of pump 22 thus completing a closed circuit in which a substantially constant volume of cooling medium is circulated at a substantially uniform rate.

The temperature of the cooling medium thus continuously circulated is controlled by heat exchange, indirect or direct, with surface water or other water the temperature of which is variable with meteorological conditions. According to the modification illustrated surface water from a suitable source, say a river, a lake or a reservoir, is pumped by means of pump 26 through line 27 into the intake of pump 22. There it co-mingles with relatively warm water from pipe 25. One unit of water will pass over the overflow partition 28 of receiver 24 and out the outlet 29 to sewer for each unit of water supplied through line 27. At a suitable point, which as shown at 30 is preferably at or near the lowermost elements of the internal cooler, there is located an automatic temperature responsive controller which is linked to automatic control valve 31 in line 27. This automatic temperature controller, responsive to the temperature of the cooling medium fed to the internal cooling elements 10, actuates the automatic control valve 31 to increase or decrease the amount of surface water introduced through line 27 as required to maintain the desired temperature.

The operation may be considered as proceeding something like this. On a very hot day in the summer, for example, the automatic control valve 31 will be wide open and the line 27 will supply all the surface water which the pump 22 is capable of taking so that maximum cooling capacity is obtained. Under these conditions if cooling is not adequate the strength of the product ends to drop off and automatic analyzer 18 actuates control valve 19 to limit the quantity of weak oleum so that the system is automatically adjusted according to its capacity to produce strong oleum. Contrarywise on a very cold day in the winter the automatic control valve 31 will be throttled way down so that very little water is supplied through the line 27 and the bulk of the cooling medium is supplied by line 25 to the intake of pump 22. Under these conditions the cooling efficiency of the absorber tower is maintained at the maximum which is consistent with satisfactory operation.

It might appear that the cooling efficiency of the internal cooler could be increased many times by passing the surface water directly through the cooling unit and relying upon the automatic analyzer and automatic control valve 19 to adjust the system, but such a contingency is just what this particular system is designed to guard against. Were the cooling efficiency in the internal cooling elements 10 allowed to exceed a certain minimum the conditions of partial pressure of sulfur trioxide in the absorption tower coupled with uncontrolled cooling in the elements 10, particularly the lowermost cooling elements where the acid is the strongest, would bring about freezing of the oleum. By recycling cooling water through the line 25 this contingency is avoided and the operation can be maintained at optimum conditions irrespective of variations in the ambient temperatures.

Such efficiency in cold weather as may be caused by lower gas temperatures will be reflected in increased strong oleum production through the adjustments made by the automatic analyzer 18 and automatic control valve 19.

Strong oleum has a high vapor pressure so that it is usually desirable to keep it in a closed system to prevent degradation by vaporization of $SO_3$. For the same reason any change in pressure is likely to be accompanied by copious evolution of sulfur trioxide. Such a condition would likely exist were the oleum withdrawn directly from the tower into the reservoir since the tower operates under a slight positive pressure created by the blower 2 whereas the reservoir 8 by reason of the vent 32 operates at atmospheric pressure. In any event the product oleum must at some stage be conditioned to atmospheric pressure.

In order to eliminate gassing in the product there are provided the de-gassing elements 12 and 13. Element 12 is the de-gassifier proper and element 13 is a hydrostatic column for equalizing the two pressures. In the de-gassifier 12, which is a closed gas-tight receptacle, the outlet pipe 6 projects into and discharges in a pipe or cup 33 in order that the oleum introduced into the de-gassifier 12 will be given a reversal of flow, as indicated by the arrows. This reversal of flow starts the gas bubbles which are entrained in the liquid in an upward direction in accordance with their natural tendency, so that they rise to the surface of the liquid and pass from the de-gassifier through the pipe 34 which vents into the bottom chamber 3 of the tower 1. This reversal of flow which is imparted to the incoming oleum segregates the gas bubbles into a vertical column leaving the oleum in the surrounding regions relatively free of gas bubbles. By locating an outlet in this region, for example, as shrown at 35 near the bottom of the de-gassifier 12, oleum relatively free of occluded gas bubbles may be withdrawn into the equalizer 13. The outlet end of pipe 36, which communicates with the outlet 35, is enlarged, as shown in the conical portion 37, for the purpose of reducing the velocity at which the oleum enters into the equalizing unit 13. As the pressure is lessened as the oleum passes up through this hydrostatic column $SO_3$ is liberated and the enlarged outlet 37 accommodates this gas-filled liquid. The $SO_3$ thus liberated is vented through line 38 into the reservoir and the oleum overflows into line 14.

My invention is particularly useful in the production of 40% oleum, that is to say in fortifying an oleum containing 20 parts by weight of free sulfur trioxide and 80 parts by weight of 100% sulfuric acid until it contains 40 parts by weight of free sulfur trioxide and 60 parts by weight of 100% sulfuric acid. As a typical example in a system designed to handle approximately 187,300 lbs. of $SO_3$ in a gas of average analysis of 10–13 volume per cent at a temperature in the vicinity of 120° C., the pump 9 which ordinarily may have a maximum capacity of approximately a million pounds per day is throttled down to approximately 500,000 lbs. per day and the feed of weak oleum adjusted to approximately 180,000 lbs. per day. Under these conditions and with the temperature of the cooling medium at 30 being adjusted to around 35 to 40° C. there is produced approximately 240,000 lbs. of 40% oleum. In other words, 60,000 lbs. of sulfur trioxide is absorbed in the absorber 1. Under comparable burdens an externally cooled tower would require the circulation over the tower of approximately six million pounds of acid per day.

While I have described my invention with reference to a preferred embodiment thereof it will be understood that variation may be made in the manner in which the process is carried out in the construction and arrangement of the various apparatus required to carry out the process and the adaptability of the processes and apparatus described in other liquid-gas systems within the spirit and scope of the invention as described.

In place of the 20% oleum there may be substituted acid of other strengths and in cases where possible it will be desirable to substitute an oleum of higher strength. In these circumstances when the 30% oleum absorber can be operated to produce stronger acid, say up to around 30% oleum, it will be advantageous to use this higher strength oleum as a feed in the process.

Correspondingly increased production of strong oleum will thus be made possible.

In a similar manner the strength of the product may be varied according to the exigencies of the particular circumstances, and although the invention is intended primarily for and exhibits optimum advantages in the production of strong oleum, that is to say oleum which when under sufficient vapor pressure to prevent degradation, will set up, that is, freeze, under ordinary conditions of temperature; yet the processes and apparatus of the invention are adapted to the production of other strengths of oleum. For this purpose other strengths of acid feed may be employed. It will also be understood that in the broader aspects of the invention the processes and apparatus may be used for the absorption of other gases in other liquid medium.

The circulation of acid over the tower should be maintained at sufficient volume to keep the cooling elements 10 thoroughly wetted because any portions of the cooling elements 10 left unwetted will be subject to an excessive rate of corrosion. With 20% oleum it will ordinarily be satisfactory to maintain approximately a 3 to 1 weight ratio between the weak acid fed to the system and the acid circulated to the tower. It may be possible to reduce this ratio if careful control is exercised. By the same token it may be desirable to increase this ratio in order to avoid critical control, but in general it will not be necessary or desirable to exceed a ratio of about 8 to 1. In case a stronger acid is fed to the system the ratio may be correspondingly reduced.

It will be understood that variations may be made in the construction and arrangement of the tower and the cooling elements therein in the weak acid line and strong acid line whereby other methods of mixing weak acid and strong acid for circulation over the tower may be employed, that the weak acid may be introduced on the strong acid side, as, for example, in the line 6 or line 14; that the automatic controllers may be replaced by hand operation and that such valves as may be necessary for throttling pump 9 and effecting control of the flow of fluids in the system may be provided; and that such other changes as are within the spirit and scope of the invention may be made.

I claim:

1. In an apparatus for absorbing sulfur trioxide in oleum, the combination which comprises a tower containing a plurality of vertical banks of serially connected horizontal pipes, a blower in a gas inlet tube connected near the base of the tower, a gas outlet near the top of the tower, the outlet ends of the serially connected horizontal pipes connecting with a vessel having an overflow means, a pipe connecting with said overflow vessel below the overflow means and communicating with an inlet pipe, said inlet pipe then connecting with the intake of a constant volume pump, a pipe connecting the exit of the constant volume pump with the entering ends of the banks of serially connected horizontal cooling pipes, temperature responsive means in the said last named pipe actuating an automatic control valve in the aforementioned inlet pipe, an oleum outlet pipe from the tower connecting with a reservoir, a pipe line connecting with the reservoir whereby the product oleum can be withdrawn, said last named pipe line connecting with a hydrostatic device for keeping a constant liquid level in the reservoir and connecting with an automatic analyzer-controller, an inlet inside the reservoir to a pump for removing oleum from the reservoir, the outlet of said last named pump being connected with a spray device in the tower above the serially connected horizontal pipes, a vent pipe from the reservoir, a pipe line for introducing weak oleum into the reservoir, said last mentioned pipe line connecting with an automatic control valve actuated by the aforementioned automatic analyzer-controller.

2. Apparatus adapted for the absorption of SO₃ in oleum comprising a tower containing a plurality of vertical banks of serially connected horizontal pipes, a system for circulating absorbent acid thru the tower, said last named system including a reservoir for collecting the effluent acid from the tower and a pump for tranferring acid from the reservoir to the tower and an inlet for relatively weak acid substantially at the intake of said pump.

LEE A. MYERS.

REFERENCES CITED

The following references are of record in the file of this patent:

UNITED STATES PATENTS

| Number | Name | Date |
| --- | --- | --- |
| 1,233,627 | Weber | July 17, 1917 |
| 1,605,004 | Shapleigh | Nov. 2, 1926 |
| 1,608,006 | Shapleigh | Nov. 23, 1926 |
| 2,034,554 | Bayer | Mar. 17, 1936 |
| 2,104,333 | Rosenblad | Jan. 4, 1938 |
| 2,162,158 | Coey | June 13, 1939 |
| 2,180,495 | Bacon | Nov. 21, 1939 |
| 2,199,691 | Carter | May 7, 1940 |
| 2,212,275 | Mojounier | Aug. 20, 1940 |
| 2,241,674 | Mohr | May 13, 1941 |
| 2,278,778 | Grossmann | Apr. 7, 1942 |